US010664466B2

(12) United States Patent
Tholfsen et al.

(10) Patent No.: US 10,664,466 B2
(45) Date of Patent: May 26, 2020

(54) SPECIFIC CONTENT DISTRIBUTION ACROSS DOCUMENTS

(71) Applicant: Microsoft Technology Licensing, LLC., Redmond, WA (US)

(72) Inventors: Michael Tholfsen, Newcastle, WA (US); Eran Megiddo, Bellevue, WA (US); Ivan Hor Siu Han, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 320 days.

(21) Appl. No.: 15/217,470

(22) Filed: Jul. 22, 2016

(65) Prior Publication Data

US 2017/0262490 A1 Sep. 14, 2017

Related U.S. Application Data

(60) Provisional application No. 62/305,076, filed on Mar. 8, 2016.

(51) Int. Cl.
*G06F 3/0488* (2013.01)
*G06F 16/23* (2019.01)
(Continued)

(52) U.S. Cl.
CPC ........ *G06F 16/2365* (2019.01); *G06F 3/0482* (2013.01); *G06F 3/04847* (2013.01);
(Continued)

(58) Field of Classification Search
CPC .... G06F 3/0488; G06F 17/30; G06F 3/04847; G06F 17/30371; G06F 17/218; G06F 17/2241; G06F 17/2288
See application file for complete search history.

(56) References Cited

U.S. PATENT DOCUMENTS 8,417,581 B2   4/2013   Ajjarapu et al.
2003/0033330 A1   2/2003   Black et al.
(Continued)

FOREIGN PATENT DOCUMENTS

JP       2008020568 A       1/2008

OTHER PUBLICATIONS

"International Search Report and Written Opinion Issued in PCT Application No. PCT/US2017/020845", dated Jun. 30, 2017, 11 Pages.

(Continued)

*Primary Examiner* — Andrea C Leggett

(57) ABSTRACT

Distributing content to multiple electronic documents or sections thereof, with various controlling users, documents states, and host devices quickly and accurately is provided herein. Content from a sender document is identified, reduced to its necessary parts, fixed in position, and validated so that it may be pushed to identified sections within the sender document or to sections in receiver documents on other host devices. Content is pushed from the sender document to sections identified as available, and each receiver section or document may have different sections and subsections available. The systems and methods provided herein operate without requiring the content to be encapsulated in new documents, and thus reduces the memory and bandwidth needed to share content remotely, and improves the user experience for sharing content.

20 Claims, 10 Drawing Sheets

(51) Int. Cl.
   *G06F 40/14* (2020.01)
   *G06F 40/117* (2020.01)
   *G06F 40/131* (2020.01)
   *G06F 40/137* (2020.01)
   *G06F 40/166* (2020.01)
   *G06F 40/194* (2020.01)
   *G06F 40/197* (2020.01)
   *G06F 3/0482* (2013.01)
   *G06F 3/0484* (2013.01)

(52) U.S. Cl.
   CPC ........ *G06F 3/04883* (2013.01); *G06F 40/117* (2020.01); *G06F 40/131* (2020.01); *G06F 40/137* (2020.01); *G06F 40/14* (2020.01); *G06F 40/166* (2020.01); *G06F 40/194* (2020.01); *G06F 40/197* (2020.01)

(56) References Cited

U.S. PATENT DOCUMENTS

| | | | |
|---|---|---|---|
| 2005/0102322 A1 | 5/2005 | Bagley et al. | |
| 2008/0168135 A1* | 7/2008 | Redlich | G06Q 10/10 709/204 |
| 2009/0248512 A1* | 10/2009 | Su | G06Q 20/10 705/14.58 |
| 2010/0151431 A1 | 6/2010 | Miller | |
| 2012/0231441 A1* | 9/2012 | Parthasarathy | G09B 7/02 434/362 |
| 2013/0290211 A1 | 10/2013 | Cho | |
| 2014/0101068 A1 | 4/2014 | Gidugu et al. | |
| 2015/0046493 A1 | 2/2015 | Akselrod et al. | |
| 2015/0118672 A1 | 4/2015 | Yeskel et al. | |
| 2015/0125834 A1 | 5/2015 | Mendoza Tascon | |

OTHER PUBLICATIONS

"Sharing Notes: Private and public note sharing", Published on: Aug. 18, 2013 Available at: https://dev.evernote.com/doc/articles/sharing.php.

"Evernote", Retrieved on: Mar. 3, 2016 Available at: https://help.evernote.com/hc/en-us/articles/209005417-Share-notes.

Darren, et al., "How can we improve OneNote for Windows?", Published on: Jul. 11, 2014 Available at: https://onenote.uservoice.com/forums/327186-onenote-for-windows-windows-phone/suggestions/6159650-ability-to-share-individual-sections-or-pages-ins.

"Moving or copying a section to another notebook", Retrieved on: Mar. 3, 2016 Available at: https://www.safaribooksonline.com/library/view/microsoft-onenote-2013/9780735672758/moving_or_copying_a_section_to_another_n.html.

"iTunes U Help", Retrieved on: Mar. 3, 2016 Available at: https://help.apple.com/itunesu/instructor/#/itu0A1DB0DC-03A6-4A93-B472-2DFF0FAA999E.

* cited by examiner

SPECIFIC CONTENT DISTRIBUTION ACROSS DOCUMENTS

CROSS REFERENCE TO RELATED APPLICATIONS

The application claims priority to U.S. Provisional Patent Application No. 62/305,076 titled "Specific Content Distribution Across Documents" filed Mar. 8, 2016, the disclosure of which is hereby incorporated by reference in its entirety.

BACKGROUND

Sharing content among electronic documents controlled by multiple users or among multiple locations in a single document is a challenge for both users and software systems to perform efficiently. Some previous workarounds required each controlling user to find and insert specific content, pulling it into their personal electronic document, or for each user to manually enter the data—introducing the possibility of transcription errors or omissions. For example, a presenter at a conference might tell audience members of an important finding, which audience members incorporate into their notes via individual screen shots, photographs of the content, text entry, or the like, which requires the presence and participation of the audience members. Other previous workarounds required multiple documents to be used; pushing new documents out to selected users for use or incorporation at the user's discretion. For example, a coworker sharing a new letterhead template may place it on a document management server, allowing others to pull the new document, email the new document to others, or access the others' file systems and replace an old document with the new. These workarounds are time consuming, error prone, and often rely on the recipients taking action, and leave senders desirous of systems and methods that can reliably and quickly push content from senders without relying on interaction with the recipient.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein to enable a user (referred to as a sending user or sender) to push specific content in an electronic document controlled by the sender to specific sections of the sender-controlled document or electronic documents controlled by other users (referred to as receiving users or receivers). The sender selects the content to distribute and to whom (and where) it is to be distributed. The selected content is then correlated to portions of the sender document, and the selected content is formatted such that it can be inserted into the selected destinations. In some aspects, the position of the selected content is fixed in the receiving section or document, and accompanying code is validated to ensure proper interpretation at the destination. Once the specific content has been pushed to the destinations, the receivers may manipulate the specific content without affecting the specific content in the master document or the other receiver documents.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1A:
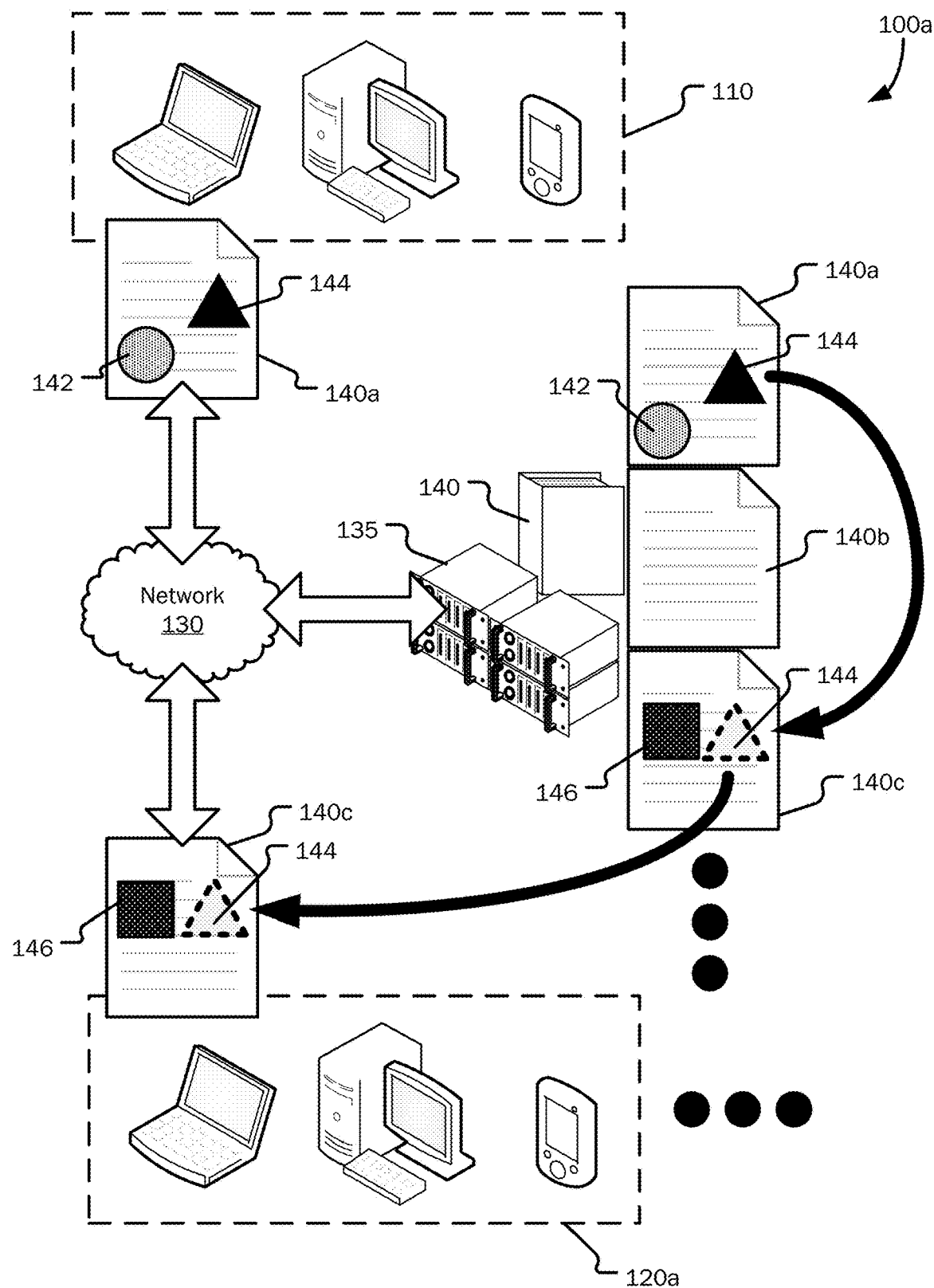
FIG. 1A illustrates an example environment in which specified content items are shared across sections of a cloud-hosted document.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods are provided herein to enable a user (referred to as a sending user or sender) to push specific content in an electronic document controlled by the sender to specific sections of the sender-controlled document or electronic documents controlled by other users (referred to as receiving users or receivers). The sender selects the content to distribute and to whom (and where) it is to be distributed. The selected content is correlated to portions of the sender document, and the selected content is formatted such that it can be inserted into the selected destinations. In some aspects, the position of the selected content is fixed in the receiving section or document, and accompanying code is validated to ensure proper interpretation by the destinations. Once the specific content has been pushed to the destinations, the receivers may manipulate the specific content without affecting the specific content in the master document or the other receiver documents.

FIG. 1A illustrates an example environment 100a in which specified content items are shared across sections of a single document. In the example environment 100a, a sender device 110 operated by the sending user transmits specified content 144 from a sender section 140a of a sender document 140 across a network 130 to be received by a cloud server 135 that hosts the sending document 140. The specified content 144 is distributed to additional sections within the sender document 140, and the changes are communicated to any active users of the sender document 140, such as a first receiving user who operates the first receiver device 120a (generally, receiver device 120). In alternative aspects, the sender device 110 may replace the cloud server 135, acting as a peer host for the sender document 140, or the distribution of specified content may be entirely local, in which case the sender document 140 is hosted by the sender device 110, and the network 130, cloud server 135, and receiver device 120 may be omitted. The receiver devices 120 may share the same physical location as the sender device 110 (e.g., a lecture hall, classroom, meeting room, conference center) or some or all of the receiver devices 120 may be remotely located relative to the sender device 110 (e.g., for online courses, sharing notes with a sick student, calling plays from a press box down to the field).

The sender device 110, the receiver device(s) 120, and the cloud server 135 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 5, 6A, 6B, and 7.

In various aspects, the network 130 represents the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). Data are transferred between the sender device 110, the receiver device(s) 120, and the cloud server 135 over the network 130 for sharing specified content 144 as well as other communications. As will be understood, the network 130 may be exclusively used for the distribution of specified content 144 or may be accessed by the computing devices for communication with devices that are not part of the distribution group.

In various aspects, the sender document 140 (and the receiver document 150 of FIG. 1B) is an electronic document associated with word processing programs, such as WORD™, note taking programs, such as ONENOTE®, spreadsheet programs, such as EXCEL®, or slide presentation programs, such as POWERPOINT®, all available from MICROSOFT CORPORATION of Redmond, Wash. Additionally, the electronic documents may be associated or opened with image editing programs, video editing programs, audio editing programs, or the like.

As illustrated in FIG. 1A, the sender document 140 is both the source and the destination of the content to be distributed. In various aspects, the sender document 140 includes multiple sections 140a, 140b, 140c, etc., in which the content may be selected from and distributed to. As will be appreciated, a document may contain more or fewer sections than illustrated in FIG. 1A. In a word processing document, a section may be a page, a paragraph, a heading delineated zone, etc. In a note taking document, a section may be a canvas, a sub-canvas, a heading delineated zone, a text box, etc. In a spreadsheet document, a section may be a range, a sheet, a grouping of sheets, etc. In a slide presentation document, a section may be a slide, a grouping of slides, a notes area, etc. One of skill in the art will be capable of applying the present disclosure to sections of various definition across programs and document types.

In various aspects, sections may include several permission levels, making them hidden, readable, or readable and writable to various users. For example, a first section 140a may be publically available so that all users with access to the sender document 140 may read and write to the first section 140a. A second section 140b, however, may be private to the sender, and no other user may read from or write to the second section 140b, and that section may be hidden from the other users so that they do not know that it exists when accessing the sender document 140. A third section 140c can be shared between a subset of the users, such that a sender may read from and write to the third section 140c, as may a first receiver, but a second receiver may neither read from nor write to the third section 140c, and may have it hidden from view. To illustrate this example, consider a sender document 140 for an online test taking application, in which the questions are held in a first section 140a (publically accessible), the answer key is held privately in a second section 140b (accessible only to a proctor), and the answer sheet for each test taker is held in a unique section 140c, etc. (accessible to the proctor and the individual test taker).

In the example environment 100a, the sender device 110 is illustrated as accessing the first section 140a as a local instance of the sender document 140 and the first receiver device 120a is illustrated as accessing the third section 140c as a local instance of the sender document 140. The sender has selected a portion of the content from the first section 140a to comprise the specified content 144, leaving the remaining content from the section to be unspecified content 142. In various aspects, the sender's selection of content and selection of destination sections to which to insert the specified content 144 is transmitted to the cloud server 135 so that the sender document 140 can be updated to insert the specified content 144 in the selected sections and then forwarded to local instances for any active receivers. In alternative aspects, the specified content 144 and selection of destination sections may be transmitted concurrently to the receiver device 120 and the cloud server 135 (if present) or only to the receiver device 120. As illustrated, the specified content 144 from the first section 140a is inserted into the third section 140c along with any existing content 146 in the third section 140c (illustrated as a dashed triangle to show insertion), and the insertion is then shared with the local instance on the receiver device 120a. The existing content 146 includes content generated within the section or previously distributed to the section before the specified content 144 is inserted into that section.

The content in the electronic documents (specified content 144, unspecified content 142, and existing content 146) may vary according the program used to provide the electronic documents. The content may comprise one or more objects present or imbedded in the electronic documents including, but not limited to: text (including text containers), numeric data, macros, images, movies, sound files, and metadata. In various aspects, the data comprising the content are stored in an elemental form by the electronic document, such as in eXtensible Markup Language (XML) or Java Script Object Notation (JSON) elements or another declarative language interpretable by a schema. The schema may define sections or content item via tags and may apply various properties to content items via direct assignment or hierarchical inheritance. For example, an object comprising text may have its typeface defined in its element definition (e.g., "<text typeface=garamond>example text</text>") or defined by a stylesheet or an element above the object in the document's hierarchy from which the element depends (e.g., a parent code element).

Figure 1B:
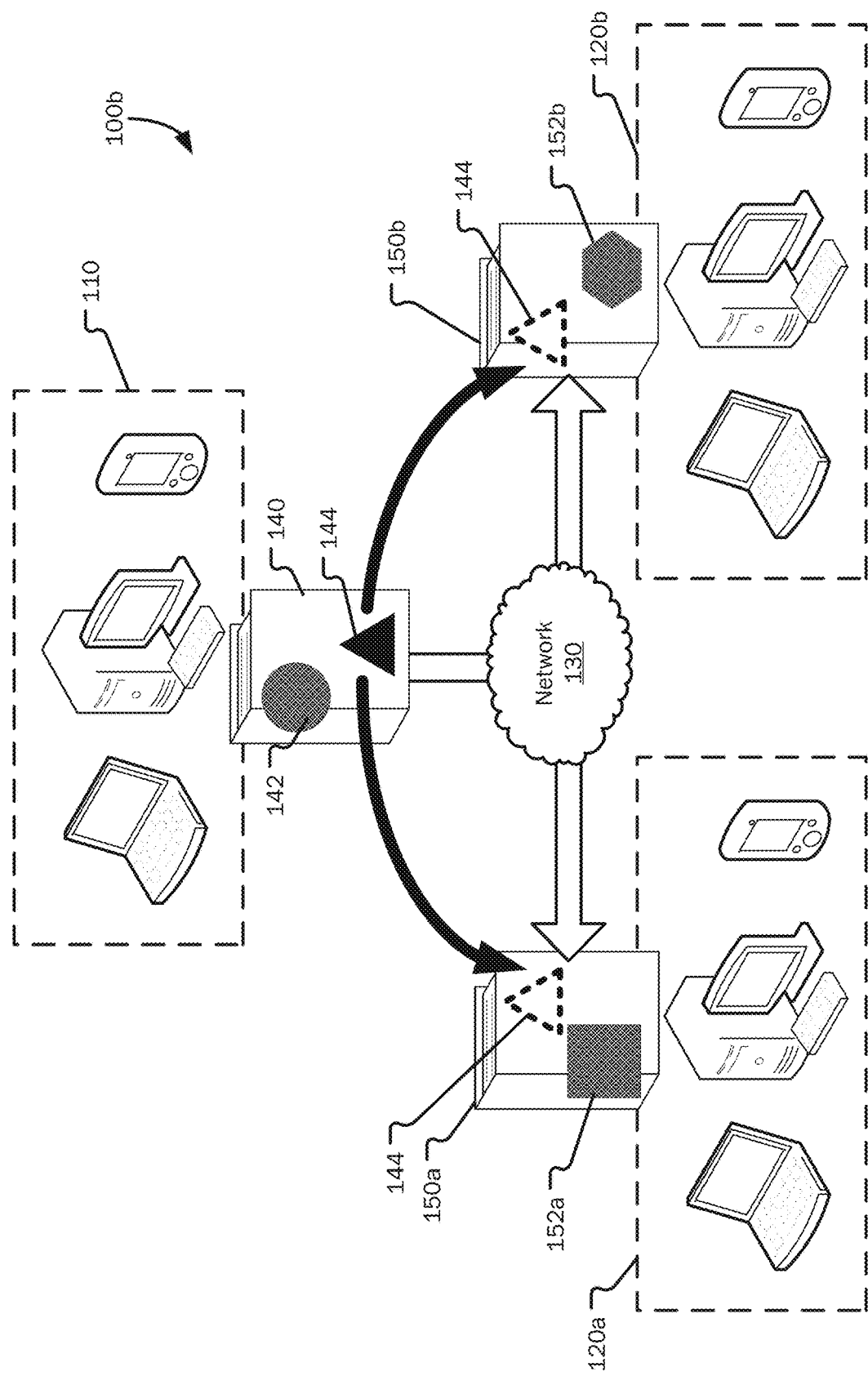
FIG. 1B illustrates an example environment in which specified content items are shared across documents.

FIG. 1B illustrates an example environment 100b in which specified content items are shared across documents. In the example environment 100b, a sender device 110 operated by the sending user transmits specified content 144 from a sender document 140 across a network 130 to be received by a first receiver document 150a and a second receiver document 150b (generally, receiver document 150), hosted by first receiver device 120a and second receiver device 120b respectively. As will be appreciated, more or fewer receiving users may receive the specified content 144 than illustrated in FIG. 1B. As will also be appreciated, in alternative aspects, the receiver documents 150 may be hosted by the sender device 110, in which case the network 130 and receiver devices 120 may be omitted. The first receiver's present content 152a is illustrated as different that the second receiver's present content 152b (generally, present content 152 and corresponding to FIG. 1A's existing content 146 for a receiver document 150) for purposes of explanation, but in some aspects the present content 152 may be identical. The present content 152 includes content generated within the receiver document 150 or previously distributed to the receiver document 150 before the specified content 144 is inserted into the receiver document 150 (illustrated as a dashed triangle to show insertion).

When the sending user selects the specified content 144 from the sender document 140 for sharing to the receiver documents 150, the sender device 110 determines which content from the sender document 140 has been selected, which other documents are to be receiver documents 150, and what section therein is to receive the specified content 144. In various aspects, once the specified content 144 is selected, the network 130 is then established between the computing devices as an ad hoc network, while in other aspects the network 130 is a preexisting communication connection between the computing devices.

Similarly to the distribution discussed in regard to FIG. 1A, the sending document 140 is sanitized to reduce the selection of specified content 144 to the code elements needed to interpret and represent the selection of content and optionally fixed in position and validated for clean insertion before the specified content 144 is transmitted to the receiver documents 150. Each receiver document 150, upon receipt of the specified content 144 then incorporates the specified content 144 into the receiver document 150 in relation to the present content 152 of the receiver document 150.

To illustrate, consider the example of a first teacher who selects content from a file containing lesson plans to be shared with the other teachers in a school who teach the same subject. The first teacher's document (corresponding to the sender document 140) is hosted on the first teacher's computing device (corresponding to the sender device 110) and includes content for several lesson plans that are to be shared (corresponding to the specified content 144) and lesson plans (and other data) not to be shared (corresponding to the unspecified content 142). The other teachers' computing devices (corresponding to the receiver devices 120) host their own files for holding lesson plans (corresponding to the receiver documents 150), to which the lesson plan will be distributed.

As will be appreciated for the examples given in regard to FIGS. 1A and 1B, the devices and documents that are referred to "senders" may also be "receivers" for other content items, and vice versa. For example a boss may share content as a sender to a subordinate to edit (as a receiver), and receive back edits to that content as a receiver from the subordinate (as a sender). Permissions may be set for various users so that they may have unlimited ability to alternate between sender and receiver with other users, or limited ability to alternate roles. For example, a teacher may have unlimited ability with students, but the students may only alternate between sender/receiver with the teacher and be blocked from distributing content between each other (or only with study-group members).

Figure 2A:
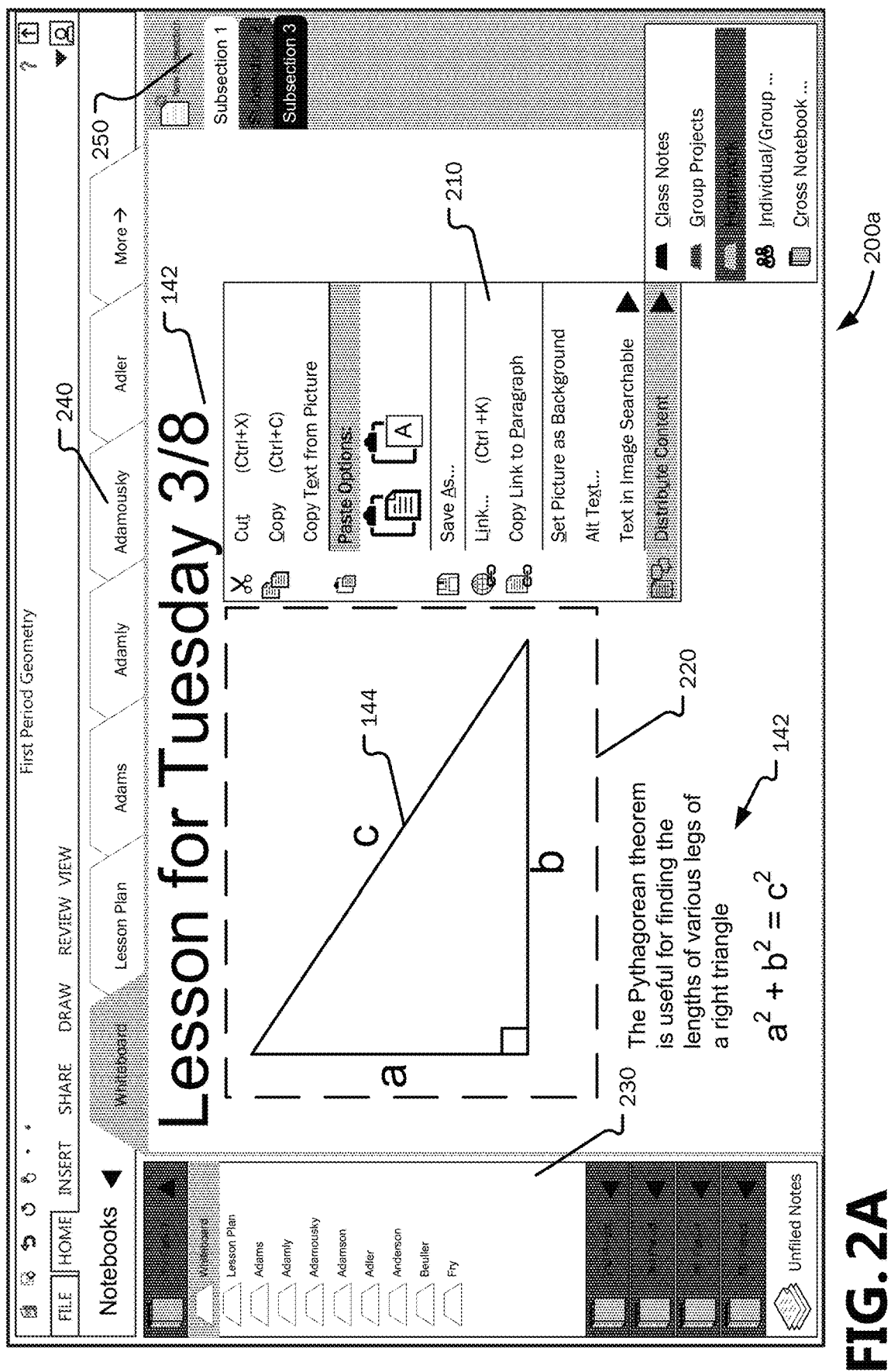
FIG. 2A is an example user interface from a sender's perspective while sharing specified content.

FIG. 2A is an example GUI 200a (graphical user interface) from a sender's perspective while sharing specified content 144. In the illustrated GUI 200a, which corresponds to a note taking program, a sender is viewing a canvas for a section named "whiteboard," from which some of the content has been selected (e.g., the specified content 144 from the unspecified content 142) and a contextual menu 210 for distributing the specified content 144 has been provided. As will be appreciated, other GUIs with different elements and arrangements thereof may be used in conjunction with the present disclosure; the examples given herein are non-limiting illustrations.

Figure 2B:
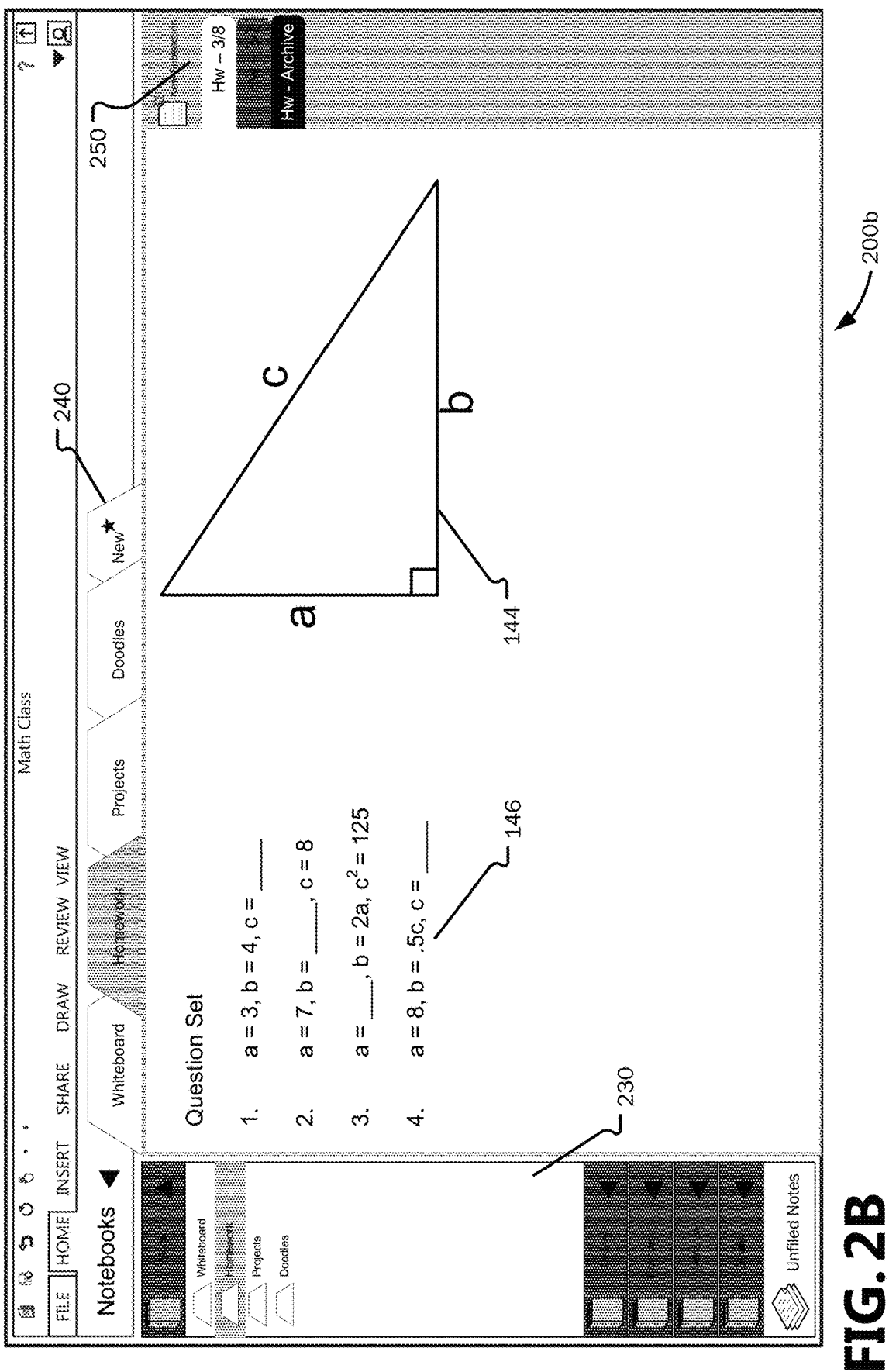
FIG. 2B is an example user interface from a receiver's perspective while receiving specified content.

FIG. 2B is an example GUI 200b from a receiver's perspective while receiving specified content 144. In the illustrated GUI 200b, which corresponds to a note taking program, a receiver is viewing a canvas for a section named "homework," into which the specified content 144 from the sender has been inserted along with the existing content 146 (or present content 152). As will be appreciated, FIG. 2B is provided for illustrative purposes of the distribution initiated from the example GUI 200a illustrated in FIG. 2A, and the content may be distributed without the receiving user accessing a GUI 200b or even running an instance of the sender document 140 or receiver document 150 at the time of distribution.

Both of the GUIs illustrated in FIGS. 2A and 2B include UI (User Interface) elements related to the control of the authoring application, which include a file and section selection window 230, section selectors 240, and subsection selectors 250. As will be appreciated, other UI components are present in the drawings that those of ordinary skill in the art will recognize, and more components tailored to different authoring applications may also be provided than those illustrated, but these components are not discussed so as to not distract from the present disclosure.

The file and section selection window 230 includes the files and optionally the sections thereof to which the user has access. For example, in the sender's GUI 200a, several files are shown that a teacher may access for different class periods, and in the receiver's GUI 200b, several files are shown that a student may have for various classes (e.g., math, history, economics, etc.). Different users may label or rename shared files for their personal use differently than other users have labeled or named the files. For example, a file named "1st Period" by a teacher may be labeled "Math" by a student (or vice versa) for the ease of each party. In various aspects, the other users or an owner user, may see the files under the original names and labels or under the new names and labels.

Within an expanded file in the file and section selection window 230 and in the section selectors 240, the various sections of a file that a user has access to are included. For example, in the sender's GUI 200a, the sections that a teacher has access to are shown, including a whiteboard section (public), a lesson plan section (private), and sections for each student that are shared with the teacher. Similarly, in the receiver's GUI 200b, the sections that a student has access to are shown, including a whiteboard section (public), homework and projects section (shared), and a doodles section (private). In various aspects, the sections may be set by an administrative user or non-administrative users may generate some or all of the sections on their own. For example, a teacher, as an administrative user, may set up a section for each student in a class by that student's name, and each student may rename the section for their personal use (e.g., as "Homework") and add additional sections as they see fit. Different users may label or rename sections for their personal use differently than other users have labeled or named a given section. For example, a teacher may create a section named "homework" for each student, where a first student labels the homework section as "Mrs. Doe—Math", while a second student labels a corresponding section as "Math Homework".

Subsection selectors 250 operate similarly to section selectors 240 in that users may add further hierarchical arrangement to their sections, as subsections are sections of sections. In various aspects, the users may view the subsections of other users as sections in their own right, or instead of sections. For example, a teacher may set up subsections for each student for homework, group projects, quizzes, etc. that the students will see as sections when they access a shared document.

In the sender's GUI 200a, the sender is enabled to graphically select which content will be the specified content 144 for distribution. As will be appreciated, graphical selection may be done via clicking on the content in the GUI, using a lasso tool (free-form or fixed form (e.g., square, rectangular, circular)) to select an area from which content will be selected, and via keyboard shortcuts (e.g., ctrl-A to select all content in a section, arrow keys or tab key to cycle through content items). In some aspects, when a first content item has been selected, the system or application may automatically select a related content item (e.g., the user has been "inking" a touch screen to enter text and one stroke of a letter/character has been selected, the other strokes that comprise that letter/character may be automatically selected).

When a user makes a graphical selection, the system or application may make a best guess as to what the user is attempting to graphically select. For example, when multiple content items reside in the same selected location as layered content (e.g., text on top of an image on top of a background image), the best guess may result in the topmost layer's content item being selected on a first attempt to select the content. In another aspect, when a user selects a portion of a content item, that content item will be selected (or not) based on what percentage of the content item was selected and whether any other content items were selected and whether those other content items are related. For example, a user who uses a lasso tool to select an image and partially selects another content item (image, text box, formula, chart, etc.), may have that other content item included in the specified content 144 if at least 10% of the other content item was selected. In another example, when the sending user has input drawings/text via a touchscreen or pen tool (i.e., "inking" input), and a stroke of a character or drawing has been selected, the other strokes related to that character or drawing by the system or application will also be selected.

When content items have been selected in the GUI 200a, a graphical selection indication 220 and a contextual menu 210 are displayed in the GUI 200a. The graphical selection indication serves to visually differentiate the specified content 144 from the unspecified content 142 in the GUI 200a. In various aspects, each content item selected may have a separate graphical selection indication 220, or all of the specified content 144 (regardless of how many content items comprise the specified content 144) may share one or more graphical selection indications 200. Graphical selection indications 220 include, but are not limited to: highlighting, graying out unselected content items, colored borders, "marching ants" borders, and the like.

The contextual menu 210 provides the sending user with lists of common or frequently used commands for the type of content item(s) selected in the GUI 200a. The commands may be further broken out into categories, which may be presented via fly-out sub-menus or groupings of commands in the contextual menu 210. From the contextual menu 210 (or a fly-out thereof), the sender may select destinations for where to distribute the specified content 144 in-file or cross-file. For example, frequently used destinations or system-suggested destination may be presented for the sender to select to automatically distribute the specified content 144 to, or options for finer control over the destination (in-file or cross-file) may be presented to the sender, which are discussed in greater detail in regard to FIGS. 3A and 3B.

As illustrated in FIG. 2B in the receiver's GUI 200b, the specified content 144 from the sender's GUI 200a has been inserted into the destination, which includes existing content 146. In various aspects, the location of the specified content 144 may be fixed when distributed to account for differences between layouts of the source and destination due to differences in unspecified content 142, existing content 146, layers and user preferences. Specified content 144 may be specified to appear at the same location in the destination as the source (moving existing content 146 or inserting formatting information as necessary), after existing content 146 in the destination, before existing content 146 in the destination, on a different or same layer as in the source or as the existing content 146, etc.

Receiving users may set documents or sections of their documents as open or closed to sharing of specified content 144 depending on administrative settings. For example, a student using a class's shared electronic notebook may have a "Class Notes" section created by the teacher that is administratively locked to allow the sharing of specified content 144, a "homework" section that the student has set to allow the sharing of specified content 144, and a "personal journal" section that the student has set as closed to content sharing. In various aspects, documents or sections that are closed to content sharing are private, and are only discoverable or visible to a controlling user.

User settings may further allow or block specified users from inserting specified content 144 and allow or block certain types of specified content 144 from being shared. For example, a notetaking application may allow a master user (e.g., a teacher) to share content with all other users, but the other users may be limited in whom they may share with (e.g., the teacher, group project members). Individual receiving users may also specifically block other users from sharing content or reject a given content item that a sending user wishes to share. For example, if a first user is being bothered by a second user's repeated attempts to share content, the first user may block content sharing from the second user. Similarly, a user may block or allow specified content 144 that comprises a given category of content (e.g., text, images, sound files, video files, tables, charts) from being shared. Moreover, in some aspects, a when specified content 144 has been inserted into a user's document or section, the receiving user may reject the insertion and thereby remove the specified content item 144 from the document or section.

When specified content 144 is inserted into the destination, the newly inserted specified content 144 may be marked in the receiver's GUI 200b as such, so that the receiver will be alerted to the new content the next time the destination is accessed. In various aspects, newly inserted content may be called out via a tooltip, a pop-up dialog, a marching-ants effect around the specified content 144, a highlight effect on the specified content, etc.

Specified content 144 that is shared to a receiver may be linked to the specified content 144 from the sender, such that when the sending user modifies the specified content 144 in the sender document or section, the shared specified content in the receiver's document or section will be updated, which may cause the specified content 144 to be called out again in the receiver's GUI 200b. In various aspects, the update to the specified content 144 in the sender document or section will cause the new version of the specified content 144 to be shared again to overwrite the previously shared specified content 144, while in other aspects, only the changes to the specified content 144 are shared to the receiver.

Although examples have primarily been given in terms of a note taking application for academic purposes, it will be understood that other applications and other purposes are possible. For example, musical composers may use an audio mixing application for musical compositional purposes, sports teams may use an image editing application to draw up and modify plays, a sales force may use a spreadsheet application for keeping track of the performance of products or salespersons, etc.

Figure 3A:
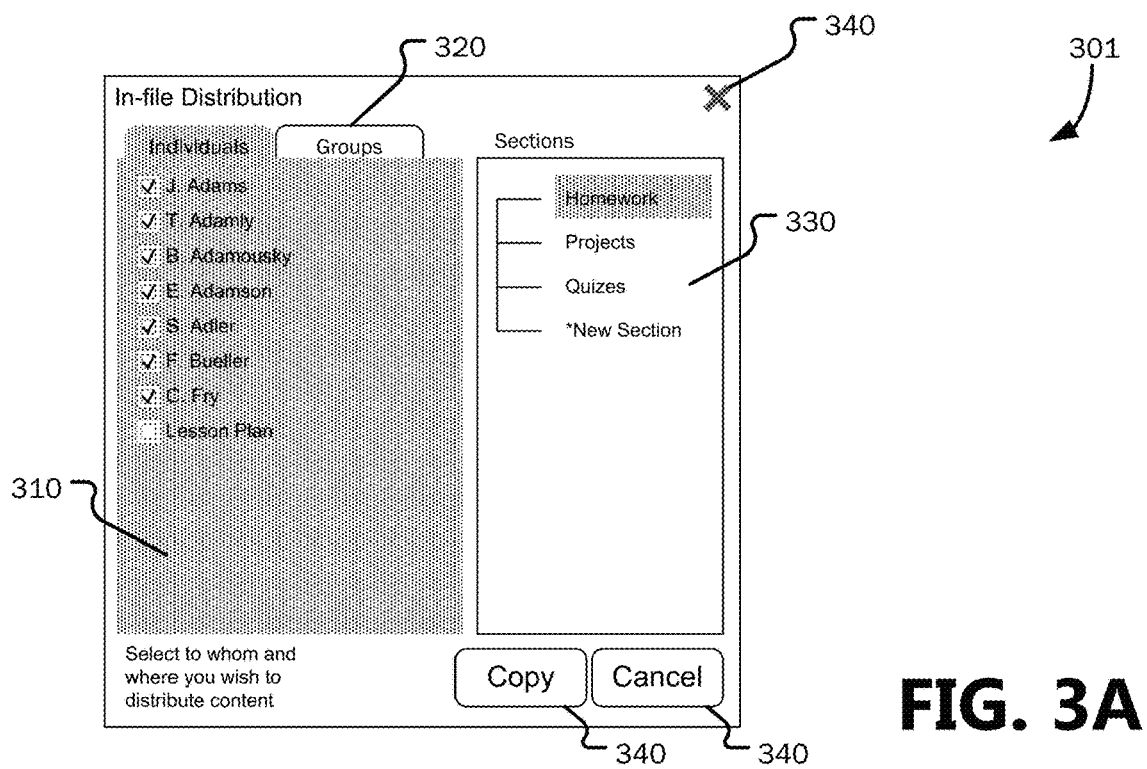
FIGS. 3A and 3B illustrate example user interfaces for selecting receivers and sections to share specified content.
Figure 3B:
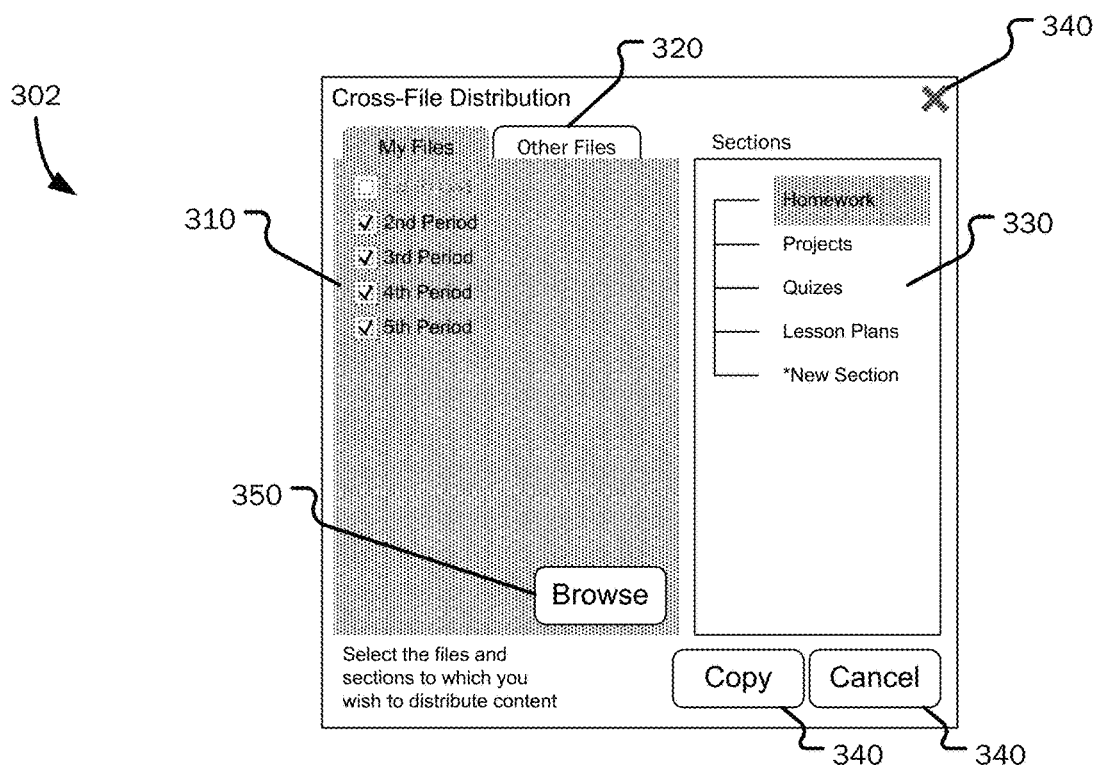

FIGS. 3A and 3B illustrate example UI 301 and 302 for manually selecting receivers and sections to share specified content 144. In various aspects, a sending user accesses the UI 301 illustrated in FIG. 3A by selecting an "Individual/Group Distribution Setup" or similar option from a contextual menu 210 for distributing content or a drop down menu or ribbon interface to distribute content within an electronic document. Similarly, in various aspects, a sending user accesses the UI 302 illustrated in FIG. 3B by selecting a "Cross Notebook Distribution Setup" or similar option from a contextual menu 210 for distributing content or a drop down menu or ribbon interface to distribute content to different electronic documents.

Both of the UIs 301 and 302 include a destinations window 310, where a sending user may select the destination sections or documents to which the specified content 144 will be shared; an alternate destinations control 320 for the destinations window 310, by which a sending user may change an organizational scheme for the destination section; and a sub-destinations window 330, where a sending user may select a hierarchically lower section than the sections displayed in the destinations window 310 to which to further direct the distribution of the specified content 144 (e.g., a section of a document, a subsection of a section, a subsubsection of a subsection). The sending user may select documents/sections/subsections via check boxes, radio buttons, highlighting or other controls to indicate which documents/sections/subsections are desired and which are not desired by the sending user for distribution.

In the in-file distribution UI 301, the sections displayed in the destinations window 310 are those available to be selected by the sending user from the sender document 140 for distributing the specified content 144. In the cross-document distribution UI 302, the documents displayed in the destinations window 310 include other files known to the sending user (as shown in the file and section selection window 230 of FIG. 2A). In various aspects, some otherwise available documents or sections may be omitted from the destinations window 310 or moved to the sub-destinations window 330. For example, the sender document 140 or section from which content is selected may be removed as an option and not presented in the destinations window 310.

The alternate destinations control 320 enables the sending user to select from alternative ways to populate the destinations window 310. For example, in the in-file distribution UI 301, automatic or user-defined groupings of sections in the sending document 140 may be provided (e.g., A/B/C/D students, even/odd participants in a presentation, sections at the beginning/end of a document, recently modified sections, students who are marked absent for the day) instead of a list of available sections to individually select or deselect. In the cross-document distribution UI 302, for example, the alternate destinations control 320 may switch the list of available sections from files hosted by the sender device 110 to files hosted by other computing devices known to the sender. As will be appreciated, other alternative presentation options are possible.

For example, a presenter may share a first piece of specified content 144 with a first half of an audience in given destination sections and a second piece of specified content 144 with a second half of an audience in the given destination sections so that the presenter may AB test questions or responses from the audience. In another example, a portion of the students in a class may have specified content 144 of a remedial quiz distributed by a teacher to associated quiz sections, and the teacher is able to select which students receive the remedial quiz in their quiz sections and which students do not based on predefined groupings (i.e., the teacher does not have to manually select which students receive the quiz from the destinations window 310).

The sub-destinations window 330 operates similarly to the destinations window 310 except at a lower hierarchical level in the destinations that it displays. For example, in the in-file distribution UI 301, the sender document 140 is the highest hierarchical level, the next highest sections in the hierarchy of the sender document 140 are displayed in the destinations window 310, and the sections below the sections displayed in the destinations window 310 are displayed in the sub-destinations window 330.

In various aspects, the sub-destinations are chosen from the subsections that are shared among the sections selected in the destinations window, while in other aspects, a commonality threshold allows for a sub-destinations shared by only a portion (e.g., 33%, 50%, at least two, all but one) of the selected destinations to be displayed. In various aspects, the names of the sub-destinations are compared (in a case-sensitive or case-insensitive analysis) for exact matches or for proximate matches. For example, in a case-insensitive analysis, sections named or labeled "homework" would be equivalent to those named or labeled "HOMEWORK." Proximate matching enables destinations to be considered equivalent based on common features in the name or label, for example, "math_homework," "Math Homework," and "Trig Homework" could all be considered to be shared sub-destinations based on the common element of "homework" in the name or label. In aspects where the sending user set up the sender document 140 for sharing with the receiving users, the names for sub-destinations that the sender originally set will be used rather than labels or re-namings applied by the receiving users for personal sections or subsections.

When a sub-destination is selected in the sub-destinations window 330 that is not shared by all of the higher destinations selected in the destinations window 310, in various aspects only an option to create a new sub-destination to insert the specified content 144 (that will then be shared by all of the selected destinations after the content is distributed) will be presented, the destinations missing the selected sub-destination will be unselected or grayed out, or the missing sub-destination will be created in the destinations when the specified content 144 is shared.

In various aspects, the sub-destinations displayed in the sub-destinations window 330 include the sub-destinations immediately lower in the hierarchy than the destinations shown in the destinations window 310, all of the shared sub-destinations displayed in a flat hierarchy, or all of the shared sub-destinations displayed with their hierarchical relationships. For example, if the illustrated "homework" sub-destination included sub-sub-destinations for each date for which homework is assigned or due, the sub-sub-destinations may be displayed as part of a tree structure that branch from the sub-destination.

The UIs 301 and 302 also include various interface controls 340, such as "Close," "Minimize," "Maximize," "Copy/Ok," "Save," and "Cancel," buttons that perform various operations on the UIs 301 and 302 or cause the distribution of content to selected sections and/or documents. As will be appreciated, in various aspects, the UIs 301 and 302 may be modal or nonmodal, and may include more or fewer elements in different arrangements than those illustrated in FIGS. 3A and 3B.

Figure 4:
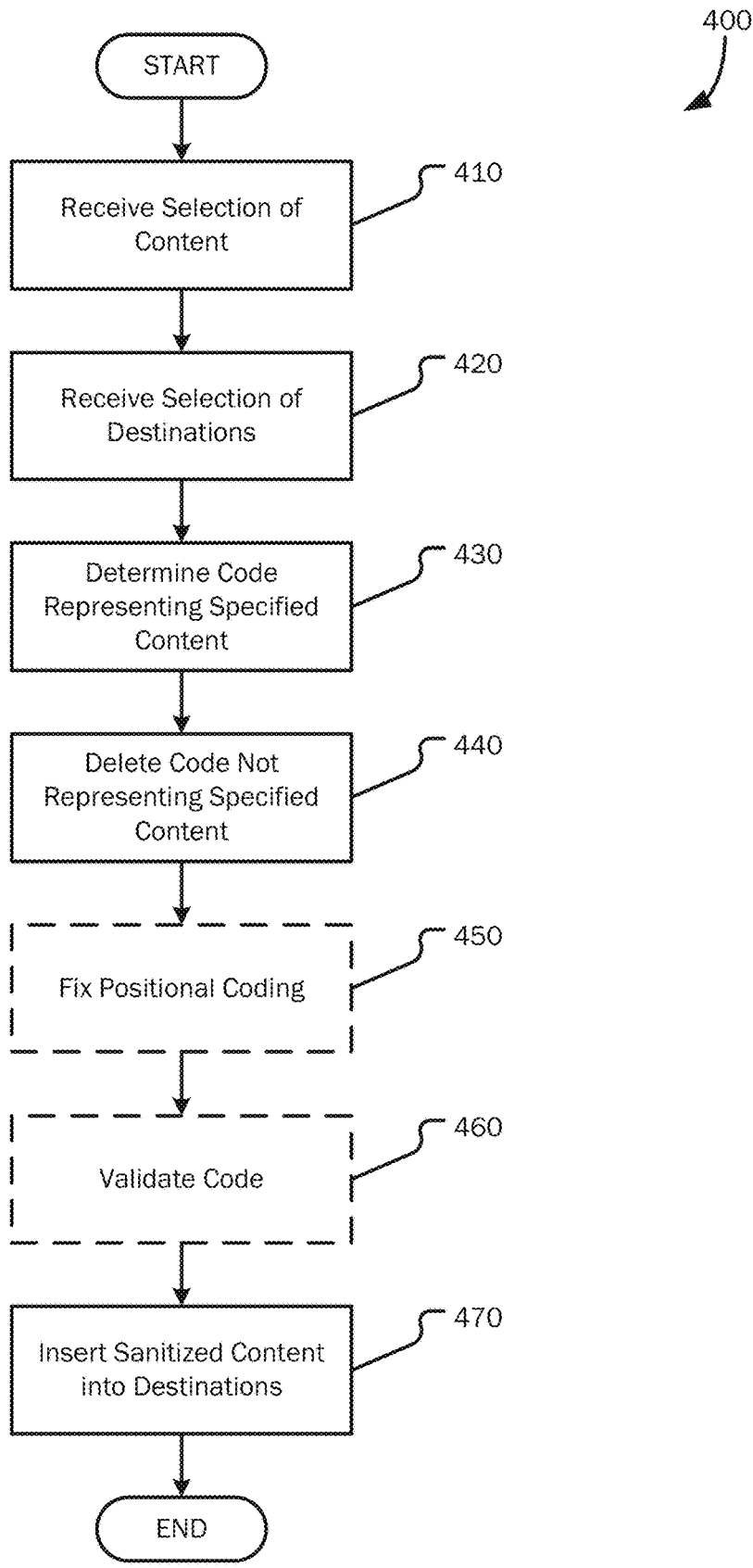
FIG. 4 is a flow chart showing general stages involved in an example method for a sharing specified content items.

In some aspects a browse control 350 is also provided in the in-file distribution UI 301 (not illustrated), in the cross-file distribution UI 302, or both. A browse control 350 may be provided within the destinations window 310, to enable the sender to manually search for more destinations to display in the destinations window 310, within the sub-destinations window 330, to enable the sender to manually search for more sub-destinations to display in the sub-destinations window, or in the main body of the UI 301 or 302 to enable the sending user to browse for both destinations and sub-destinations. Although only one browse control 350 is illustrated in FIGS. 3A and 3B, more may be provided in other aspects FIG. 4 is a flow chart showing general stages involved in an example method 400 for sharing specified content items. By employing method 400, the efficiency at which computer systems share content from electronic documents is improved and an improved user experience is provided that allows users to distribute content with fewer "clicks" or other manual operations and with less reliance on other users. According to method 400, only the code elements supporting the specified content 144 to be distributed need to be transmitted. Method 400 ensures that the amount of data needed to export the specified content 144 is minimized to the code elements needed to properly display the specified content 144 in the destination, so that a full document or full underlying codebase does not need to be shared.

Method 400 begins at OPERATION 410, where a selection of content is received. In various aspects, content items are selected graphically via clicking on the content item in a GUI (e.g., GUI 200a) or selecting an area in which the content items resides in a GUI via a lasso tool (free-form or fixed-form). In other aspects, content items are selected programmatically via object identifiers associated with the content items. In yet other aspects, a last selected or modified content item (or content items) is selected automatically when no content items have been graphically or programmatically selected.

At OPERATION 420 a selection of destination section(s) is received. In various aspects, destination sections are selected from within the electronic document from which the specified content 144 was selected, while in other aspects, the destination sections are selected from other electronic documents. Which sections are selected as destination sections may be chosen from a contextual menu 210, based on the selection of one or more content items from the GUI, or based on selections from other UI, such as in-file distribution UI 301 or cross-file distribution UI 302. In various aspects, the sending user may select from various hierarchical levels within the destination document to be the destination section and may select subsets of the available destination sections to which to distribute the specified content 144.

Method 400 then proceeds to OPERATION 430, where the code representing the specified content 144 is determined. In various aspects, the underlying code that the specified content 144 is selected from (the sender document 140) and the electronic code that comprises the electronic document(s) to which the specified content 144 will be distributed (the sender document 140 or receiver documents 150) are presented in a declaratory language or markup language, such as XML or JSON. The content items presented in the GUI are represented as objects in the code, which may inherit properties from other objects in the code due to references in the code or a hierarchical arrangement of elements. At OPERATION 430, it is determined which elements in the code are referred to by the specified content 144 or are referred to by the specified content 144 (i.e., on which the specified content depends). The application or system may then make a copy of the source section, noting the sections of the code that are needed to represent the specified content 144, which is further processed in OPERATION 440 to remove code that is not needed to represent the specified content 144.

Proceeding to OPERATION 440, the code that is not needed to represent the specified content 144 is deleted to create a sanitized content item. As will be appreciated, in an electronic document that is comprised of code formed in a declaratory language or markup language, the elements that define the specified content 144 may inherit properties from hierarchically superior elements or style sheets. When deleting code not needed to represent the specified content 144 these parent elements may be incorporated into the child elements that represent the specified content 144 and deleted, or may be incorporated into the sanitized content item.

As will be appreciated, certain properties cannot be passed to the destination without interfering with existing content 146. For example, Object identifiers (IDs), and callback IDs may be specific to the source or destination and cannot be repeated, and are therefore stripped during the sanitization process. Similarly, document IDs, sections IDs, creation dates, modification dates, access dates, user access permissions, file location information, file size information, owner information, and other data or metadata may be in conflict with data or metadata from the destination, and therefore may be deleted from the sanitized content item for the destination to replace with its own data and metadata when the sanitized content item is inserted into the destination.

By reducing the specified content item(s) into a sanitized content item and performing those operations at the source for distributed content, the system may reduce the processing resources needed to determine how to insert the specified content 144 (by not requiring multiple determinations at each destination), and reduce the amount of data that need to be transmitted over a network 130 (or within a system for a local distribution) to distribute the specified content 144 to a compacted form for direct insertion in the destination.

At OPTIONAL OPERATION 450 the positional information in the sanitized content item is fixed. Fixing the positional information enables the specified content 144 to be placed in various locations relative to any existing content 146 in the destination (e.g., before the existing content 146, after the existing content 146) and to account for positional differences between the source and the destination. For example if the specified content 144 is taken from the tenth page of the source, and the destination only has one page worth of existing content 146, the positional information of the specified content 144 may be fixed to appear after the existing content 146 on the first (or second) page and not be placed on the tenth page with several pages of no content between the existing content 146 and the newly inserted specified content 144.

At OPTIONAL OPERATION 460 the sanitized content item is validated to ensure that it can be successfully distributed to the destination. In some aspects, the sanitized content item is checked against a base schema (such as a Document Type Definition (DTD)) for the document or the customized schema for the destination to ensure that no specially declared data exist in the sanitized content item that cannot be interpreted at the destination. The schema may be from the source, the destination, or from both. In various aspects, OPERATION 440 and OPTIONAL OPERATION 460 are run multiple times in succession to reduce the size of the sanitized content item to the minimum size that is interpretable by the destination, and whenever validation fails, the deletion done at OPERATION 440 is undone.

Method 400 then proceeds to OPERATION 470, where the sanitized content item is inserted into the destinations so that the specified content 144 is distributed to those destinations. In various aspects, the specified content 144 may be inserted to incorporate the themes and formatting of the destination or may retain its formatting, for example, a typeface may be specified from the source or be incorporated from the destination. Because the specified content 144 is inserted into the code defining the destination, in various aspects no save operation needs to be performed to incorporate the specified content 144; insertion acts as a save operation.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

FIGS. 5-9 and the associated descriptions provide a discussion of a variety of operating environments in which examples are practiced. However, the devices and systems illustrated and discussed with respect to FIGS. 5-9 are for purposes of example and illustration and are not limiting of a vast number of computing device configurations that are utilized for practicing aspects, described herein.

Figure 5:
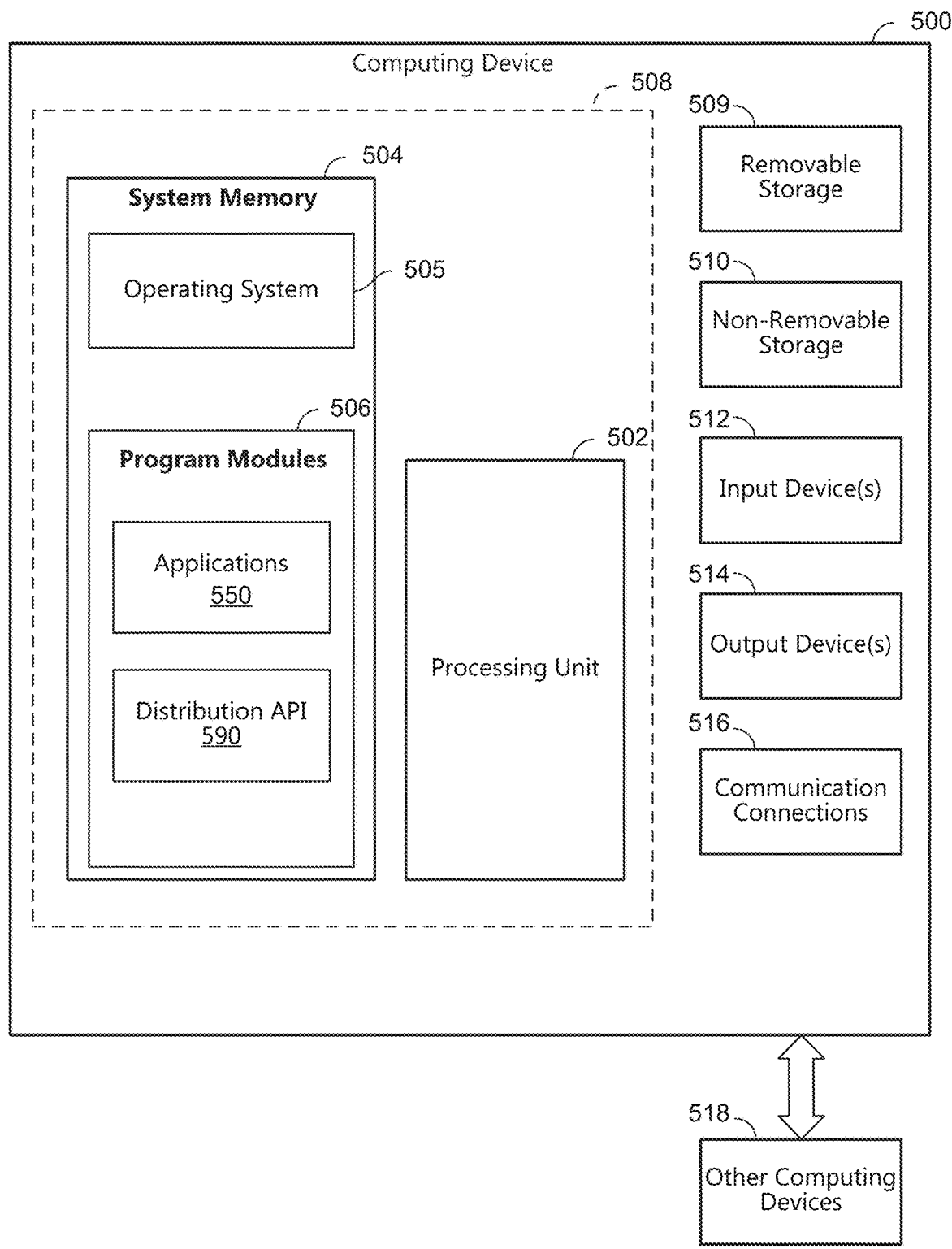
FIG. 5 is a block diagram illustrating physical components of a computing device with which examples may be practiced.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes a distribution API 590 (Application Program Interface), operable to enable a software application 550 to employ the teachings of the present disclosure via stored instructions. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., distribution API 590) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Figure 6A:
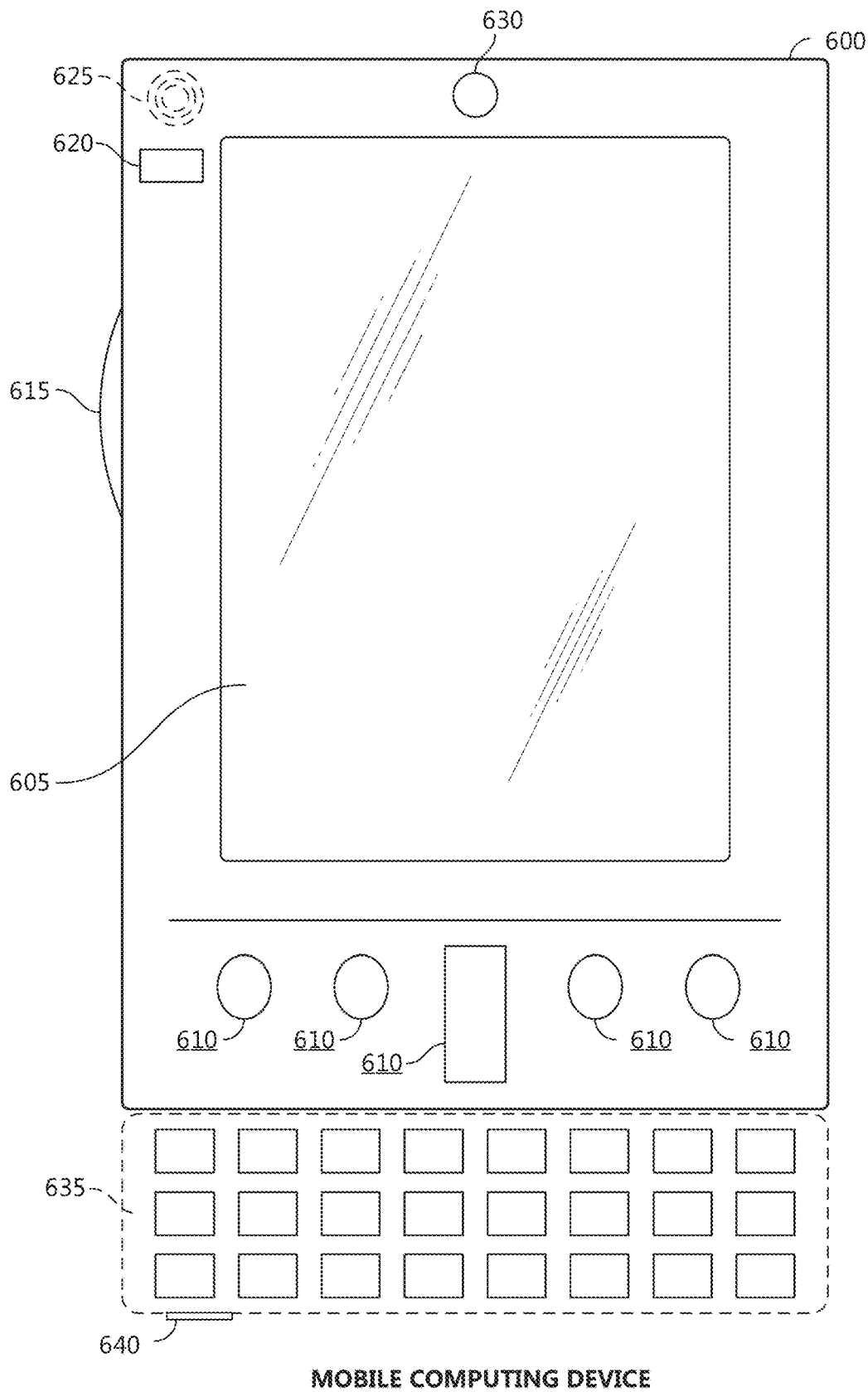
FIGS. 6A and 6B are block diagrams of a mobile computing device with which aspects may be practiced.
Figure 6B:
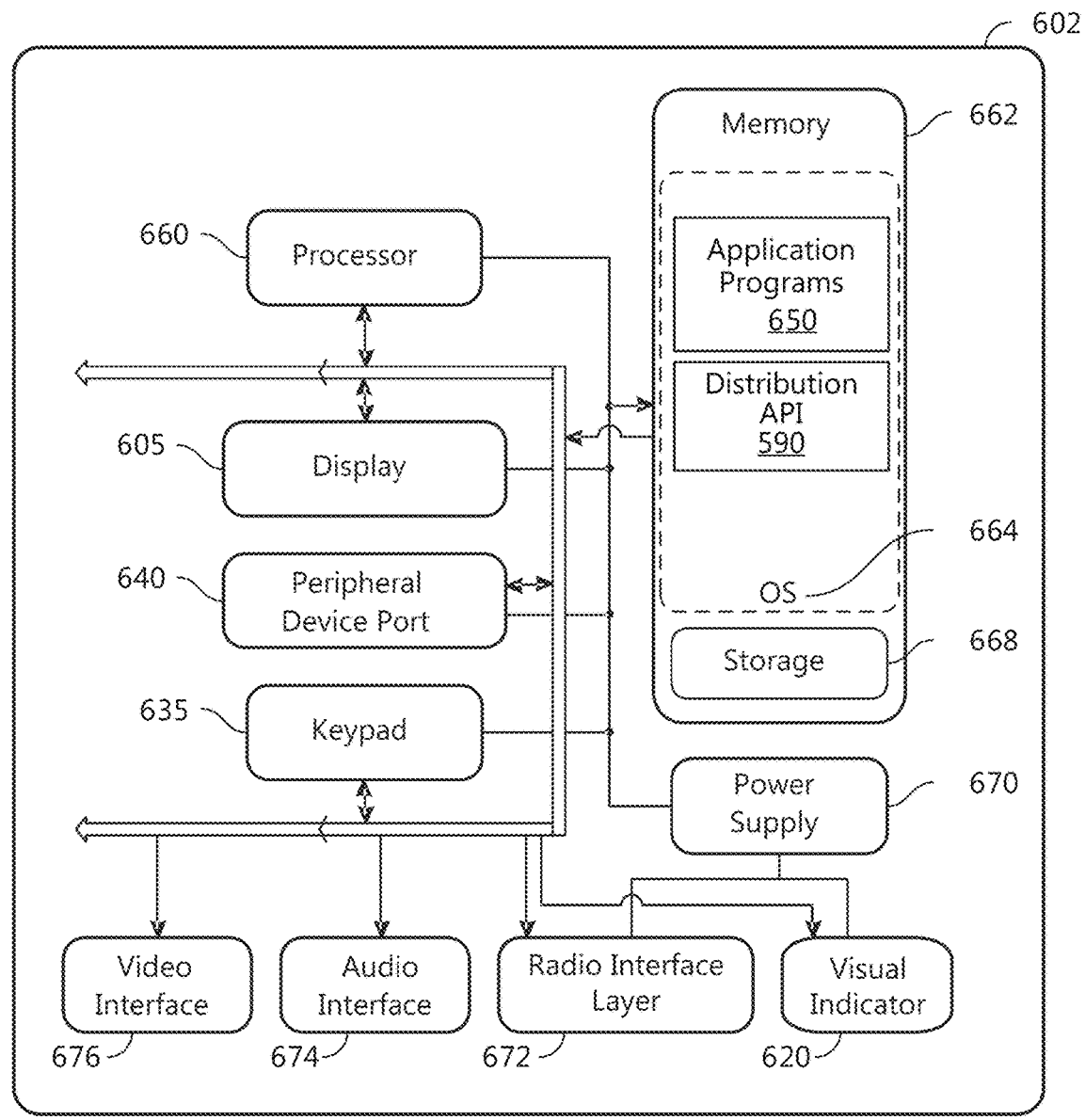

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates a peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, distribution API 590 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated, such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

Figure 7:
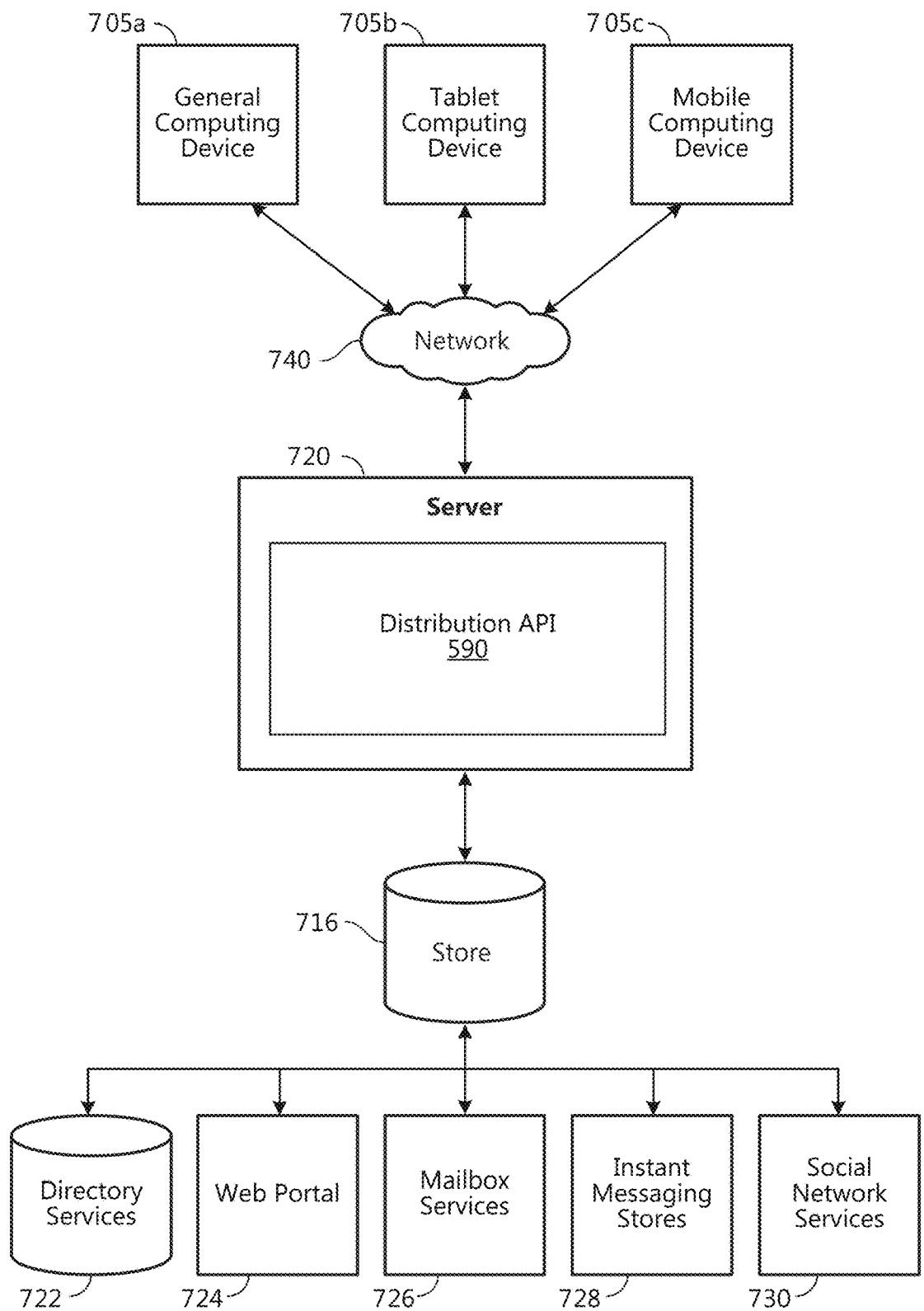
FIG. 7 is a block diagram of a distributed computing system in which aspects may be practiced.

FIG. 7 illustrates one example of the architecture of a system for automatic presentation of blocks of repeated content as described above. Content developed, interacted with, or edited in association with the distribution API 590 is enabled to be stored in different communication channels or other storage types. For example, various documents may be stored using a directory service 722, a web portal 724, a mailbox service 726, an instant messaging store 728, or a social networking site 730. The distribution API 590 is operative to use any of these types of systems or the like for distribution of selected content, as described herein. According to an aspect, a server 720 provides the distribution API 590 to clients 705a-c (generally clients 705), which may be run on sender devices 110, receiver devices 120, or cloud servers 135. As one example, the server 720 is a web server providing the distribution API 590 over the web. The server 720 provides the distribution API 590 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for improving how a computer system shares content via electronic documents, comprising:
   receiving a selection of a graphical element from a graphical user interface corresponding to at least one content item in an electronic document of a sender;
   identifying at least one destination section to which to transmit the at least one content item, wherein the at least one destination section is in an electronic document of a receiver;
   identifying code elements in the electronic document of the receiver that correspond to the at least one content item;
   sanitizing the at least one content item to create a sanitized content item, the sanitized content item comprising the identified code elements and parent code elements from which the identified code elements depend, wherein sanitizing the at least one content further comprises deleting code originating from the electronic document of the sender that is unrelated to the at least one content item; and
   distributing the at least one content item to the at least one destination section by transmitting the sanitized content item to the at least one destination section of the electronic document of the receiver and incorporating the sanitized content item into the at least one destination section of the electronic document of the receiver.

2. The method of claim 1, further comprising:
prior to distributing the at least one content item, fixing a position of the at least one content for insertion into the at least one destination section.

3. The method of claim 1, further comprising:
prior to distributing the at least one content item, validating that the sanitized content item in association with a schema for each of the at least one destination section.

4. The method of claim 1, wherein the at least one destination section is located in different document than the electronic document from which the at least one content item is selected for distribution.

5. The method of claim 1, wherein sanitizing the at least one content item further comprises:
removing properties of the at least one content item that cannot be passed to the at least one destination section.

6. The method of claim 5, wherein the properties of the at least one content item that cannot be passed to the at least one destination section include:
a creation date;
a modification date;
an object identifier; and
a callback identifier.

7. The method of claim 1, wherein receiving the selection of the graphical elements further comprises:
receiving an area of selection in the graphical user interface;
determining whether one or more objects are located in the area of selection;
in response to determining that the one or more objects are located in the area of selection, determining the at least one content item associated with the one or more objects.

8. The method of claim 7, wherein determining whether the one or more objects are located in the area of selection further comprises:
when a given object of the one or more objects is located partially in the area of selection, determining whether the given object is located in the area of selection based on a percentage of the given object that is located in the area of selection.

9. The method of claim 1, wherein receiving the selection of the graphical elements further comprises:
receiving an inking input as the graphical elements;
identifying additional inking inputs associated with the inking input;
specifying the additional inking inputs and the inking input as the specified content.

10. The method of claim 1, wherein the parent code elements from which the code elements that correspond to the at least one content item depend are defined in a stylesheet.

11. A system for improving sharing content via electronic documents, comprising:
a processor; and
a memory storage device, including a instructions, which when executed by the processor are operable to:
receive a selection of graphical elements from a graphical user interface corresponding to at least one content item in an electronic document of a sender;
identify at least one destination section to which to transmit the at least one content item, wherein the at least one destination section is in an electronic document of a receiver;
identify code elements in the electronic document of the receiver that correspond to the at least one content item;
create a sanitized content item, the sanitized content item comprising the code elements from the electronic document of the sender that correspond to the at least one content item and include parent code elements from which the code elements depend from in the electronic document of the sender, wherein crating the sanitized content item comprises deleting code originating from the electronic document of the sender that is unrelated to the at least one content item; and
distribute the at least one content item to the at least one destination section by transmitting the sanitized content item to the at least one destination section of the electronic document of the receiver.

12. The system of claim 11, wherein the electronic document of the sender is hosted as a shared electronic document accessible by the receiver associated with various sections of the shared electronic document.

13. The system of claim 12, wherein the at least one destination section is stored in the shared electronic document wherein a first destination section of the at least one destination sections is associated with the first receiver and a second destination section of the at least one destination sections is associated with a second receiver and the at least one content item is distributed from the electronic document of the sender.

14. The system of claim 13, wherein the first receiver and the second receiver do not have permission to access the electronic document of the sender.

15. The system of claim 11, wherein each of the at least one destination sections are stored in an electronic document of a third receiver.

16. The system of claim 15, wherein the sender specifies the receiver and the at least one destination section is identified by the receiver.

17. A method of improving content sharing via electronic documents, comprising:
identifying a sender document section comprising code elements, from which an item of specified content is selected;
producing a sanitized set of code elements from the code elements comprising the sender document section, wherein the unrelated code elements that describe aspects of the sender document that are unrelated to the item of specified content are removed from the sanitized set;
determining whether the sanitized set of code elements is operable to be inserted into a receiver document section, such that the receiver document section will include the item of specified content; and
transmitting the sanitized set to the receiver document section.

18. The method of claim 17, wherein the receiver document section resides in a shared document including the sender document section, wherein the sender document section is associated with a first user and the receiver document section is associated with a second user.

19. The method of claim 18, wherein the first user does not have access to the sender document section.

20. The method of claim 17, wherein producing the sanitized set of code elements further comprises:
incorporating parent elements from which the code elements describing the item of specified content depend into the code elements describing the item of specified content.

* * * * *